(12) United States Patent
Okuwaki et al.

(10) Patent No.: US 6,768,536 B2
(45) Date of Patent: Jul. 27, 2004

(54) LIQUID CRYSTAL MICROLENS

(75) Inventors: Daisaku Okuwaki, Yamanashi-ken (JP); Susumu Sato, Akita-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/302,883

(22) Filed: Nov. 25, 2002

(65) Prior Publication Data

US 2003/0098938 A1 May 29, 2003

(30) Foreign Application Priority Data

Nov. 28, 2001 (JP) ........................................ 2001-363349

(51) Int. Cl.[7] .................................................. G02F 1/13
(52) U.S. Cl. ...................................................... 349/200
(58) Field of Search .......................... 349/200, 95, 186

(56) References Cited

U.S. PATENT DOCUMENTS 6,116,739 A 9/2000 Ishihara et al.

FOREIGN PATENT DOCUMENTS

JP 11289422 10/1999

OTHER PUBLICATIONS

"Effects of Low Polymer Content in a Liquid–Crystal Microlens", Nose et al, Optical Society of America, 1997, vol. 22, No. 6, pp. 351–353.

"Liquid Crystal Lens Array", Chang et al, IBM Technical Disclosure Bulletin, 1981, vol. 24, No. 4, pp. 2030 and 2031.

Primary Examiner—James A. Dudek
(74) Attorney, Agent, or Firm—Dennison, Schultz, Dougherty & MacDonald

(57) ABSTRACT

There is provided a pair of transparent upper and lower glass substrates which are disposed apart from each other so as to form a space there-between, a pair of electrodes provided on the underside of the upper substrate and on the upper surface of the lower substrate. A plurality of circular holes are formed in each of the electrodes. A liquid crystal is charged in the space. The liquid crystal has a lens construction formed by an electric current and hardened by irradiation of ultraviolet rays.

3 Claims, 15 Drawing Sheets

ALIGNING DIRECTION →

CONSTANT OF REFRACTIVE INDEX

LIQUID CRYSTAL MICROLENS

BACKGROUND OF THE INVENTION

The present invention relates to a liquid crystal microlens used as a means for forming an image in a lens array.

There is commonly known a contact-type sensor having a construction such as that of FIGS. 14 and 15.

Referring to FIG. 14, a sensor 110 has a frame 108 in which are mounted a linear light-emitting element (LED) array 105, a rod lens array 106, and light-receiving element array 104. The light-receiving element array 104 comprises a substrate 103 formed at the bottom of the frame 108, a protection film 102 mounted on the substrate 103, and a sensor IC 101 comprising a plurality of photoelectric converters. A transparent plate 107 on which a text sheet 109 is set is mounted on the upper portion of the frame 108.

In operation, a light beam from the LED array 105 irradiates the text sheet 109. The light beams diffused and reflected at a particular reading line of the sheet 109 passes through the rod lens array 106 so as to form an image on the text upon the sensor IC of the light-receiving element array 104. Information regarding the shades of the text sheet conveyed by the reflected light, taking the form of the intensity of light, is converted into an electric signal by the sensor IC 101 and serially outputted in accordance with the scanning direction. After scanning one line in the scanning direction, the next line in the direction perpendicular to the scanning direction is scanned. By repeating the scanning operation, two-dimensional information on the text sheet 109 is converted into an electric signal in time sequence. FIG. 15 shows the arrangement of the rod lens array 106 of the contact-type sensor 110 shown in FIG. 14 and the operation thereof.

The principle and the construction of the rod lens array 106 are described hereinafter with reference to FIGS. 16a to 16c. Each rod lens of the rod lens array 106 is a graded index lens, each having a refractive index distribution shown in FIG. 16a. FIG. 16b shows the transmission of a light beam through the rod lens.

In FIG. 16a, the distribution of the refractive index n can be approximately expressed as $$n = n_0(1 - (A/2)r^2)$$

where $n_0$ is the refractive index on the optical axis, r is the distance from the optical axis in a radial direction, and A is the constant of the refractive index. The light beams tend to travel slower in a range where the refractive index is large and faster where the refractive index is small.

Due to such a characteristic, the light beam entered in the rod lens follows a path according to the winding interval P, which depends on the distribution of the refractive index, and is emitted out from the opposite end of the lens as shown in FIGS. 16a and 16b.

As shown in FIG. 16c, by setting an appropriate rod lens length $Z_0$ in relation to the winding interval, an erecting image Q" of an image Q equal in size thereto can be formed at the opposite side of the rod lens at a distance TC. The image forming operation is also described in FIG. 15.

The reference $L_0$ in FIG. 16c is a working distance between the rod lens and the object Q (Q").

The rod lens is provided with the following characteristics.

(1) The rod lens has end faces which are flat, and is light in weight.

(2) The condition of the formed image can be arbitrarily changed dependent on the length of the rod lens.

(3) The image can be formed on the end surface of the lens, and furthermore, a lens with a short focal length can be provided.

(4) The optical axis of the lens coincides with the geometric center so that the lens can be easily adjusted.

Methods for imparting the refractive index distribution to a glass rod include ion implantation, molecular stuffing, and ion exchange method. In the case of rod lens, the ion exchange method is used so that the distribution becomes smooth and symmetrical.

Referring to FIG. 17, the ion exchange method employs a kiln 112 containing a fused salt 113 of high temperature. A glass rod 116 is immersed in the salt 113 so that an alkali ion A in the glass rod and an alkali ion B in the salt 113 are exchanged with each other. As a result, there is formed in the glass rod 116 an ion concentration distribution which is in proportion to the refractive index distribution described above.

However, the rod lens thus formed has the following problems.

(1) In order to manufacture the rod lens, there is a need to provide a device for the ion conversion treatment so that the manufacturing cost increases.

(2) The conjugation length TC, which is the distance between the original object and the image formed, can only be selected from the lineup of the rod lens products. Thus the distance TC cannot be shortened for manufacturing a thin contact-type sensor.

In order to solve the problem, there has been proposed a lens where a known liquid crystal lens shown in FIGS. 18a and 18b is used instead of the rod lens array. The construction and the features of the liquid crystal lens are described in a known publication OplusE., October, 1998, Vol. 20, No. 10, Kabushiki Kaisha Shingijutsu Communication, featuring liquid crystal optical elements and their applications: liquid crystal microlens.

In order to form an optical element which serves as a lens with a liquid crystal, a liquid crystal layer, which becomes a medium, may be shaped into lens as in glass lenses. Alternatively, the optical element maybe constructed so that a spatial refractive index may be imparted. In a nematic liquid crystal cell, liquid crystal molecules are aligned in the direction of an electric field. Thus, due to the distribution effect of the liquid crystal molecules in the electric field which is symmetric with respect to the axis and inhomogeneous, a lens having a spatial refractive index distribution can be provided. When such a liquid crystal lens is employed, a microlens array where a plurality of miniaturized lens are arranged in two dimensions in a flat plate is easily provided.

Referring to FIGS. 18a and 18b, the nematic liquid crystal cell 121 comprises a lower transparent glass substrate 123, an upper transparent glass substrate 122, a pattern electrode 124a on the lower transparent glass substrate 123, a pattern electrode 124c formed on the underside of the upper transparent glass substrate 122, a transparent alignment layer 125a on the electrode 124a, a transparent alignment layer 125b on the electrode 124c and an enclosing member 127 provided between alignment layers 125a and 125b. The pattern electrode 124a is formed by a conductive electrode film and has a plurality of circular holes 124b, and the pattern electrode 124c is also formed by a conductive electrode film and has a plurality of circular holes 124d. Each of the circular holes 124d is concentrically formed with an opposite hole 124b. A liquid crystal material 128 is injected into a space defined by the enclosing member 127 and the alignment layers 125a and 125b. The alignment layers 125a and 125b are rubbed so that the alignment of each layer is antiparallel and homogenous to one another. The pattern electrodes 124a and 124c are so disposed that the holes 124b and the holes 124d coincide.

When the liquid crystal cell 121 is applied with a voltage higher than a threshold, electric potentials are distributed as shown by contour lines in FIG. 19a. As shown in the figure, the electric field intensity has such a spatial distribution as to be increased as the distance from a center of the hole 124b (124d) of the pattern electrode 124a (124c) increases in the radial direction, that is, a distribution is symmetrical about the axis of the cell.

In FIG. 19b, a section of the liquid crystal material 28 is divided into a plurality of regions by the contour lines and the vertical division lines, and a typical director is shown for each region.

Namely, when a voltage larger than a threshold voltage is applied, liquid crystal molecules are aligned in a direction balanced by the resilience of the liquid crystal determined by the alignment layer and aligning force caused by the electric field. More particularly, as shown in FIG. 19b, the liquid crystal molecules are inclined at the maximum angle with respect to the horizontal direction of the substrate at a portion adjacent the periphery of the hole, and the inclination becomes smaller towards the center portion of the pattern. In other words, since the liquid crystal molecules are aligned along the electric field distribution which is symmetrical with respect to the axis, the effective refractive index is so distributed as to be decreased adjacent the periphery of the hole 124b of the electrode and to be increased at the center of the hole. Thus, although the liquid crystal lens has flat end surfaces, the lens has the characteristic of a convex lens.

When the liquid crystal microlens is applied to such a sensor as the sensor 110 in FIG. 14 instead of the rod lens, an image of the text can be formed at the receiving portion of the sensor so as to be scanned. The liquid crystal microlens is thinner than the rod lens so that sensor having a smaller thickness can be manufactured. Moreover, the liquid microlens can be produced by an easier method than the ion exchange method of the rod lens. In addition, by controlling the voltage applied to the electrodes, the refractive index of the liquid crystal can be controlled, thereby enabling to set a desired resolving power, depth of focus, brightness and focal length as required. Hence a handy lens can be provided.

However, when the liquid crystal microlens is adapted for a contact-type sensor for reading an image on a text, there occur the following problems.

(1) The electrode of the liquid crystal lens must be applied with voltage during the whole time the text is being read, thereby increasing the power consumption. Hence in a hand scanner for a facsimile machine driven by a battery, the life of the battery is decreased.

(2) Depending on whether the voltage applied to the liquid crystal microlens is alternating current or direct current, and on the level of the voltage, a liquid crystal driving IC must be provided in the power source of the sensor so that the manufacturing cost is increased.

(3) Since it takes some time for the molecules of the liquid crystal to align in the desired direction after the voltage is applied, the response time dependent on the response speed becomes necessary. Hence a waiting time is required for the scanner to start scanning so that the operability of the sensor is deteriorated.

SUMMARY OF THE INVENTION

An object of the present invention is to provide a liquid crystal microlens where the above described problems are resolved.

According to the present invention, there is provided a liquid crystal lens comprising a pair of transparent upper and lower glass substrates which are disposed apart from each other so as to form a space there-between, a pair of electrodes provided on the underside of the upper substrate and on the upper surface of the lower substrate, an alignment layer formed on each of the electrodes, at least one electrode having at least one hole, an ultraviolet curable liquid crystal material charged in the space, the liquid crystal material having a lens construction formed by an electric current and hardened by irradiation of ultraviolet rays.

Furthermore, there is provided a liquid crystal lens comprising a pair of transparent upper and lower glass substrates which are disposed apart from each other so as to form a space there-between, a pair of electrodes provided on the underside of the upper substrate and on the upper surface of the lower substrate, an alignment layer formed on each of the electrodes, each of the electrodes having a plurality of circular holes, each of the holes of one of the electrodes being opposed to the hole of the other electrode, an ultraviolet curable liquid crystal material charged in the space, the liquid crystal material having a lens construction formed by an electric current and hardened by irradiation of ultraviolet rays.

These and other objects and features of the present invention will become more apparent from the following detailed description with reference to the accompanying drawings.

BRIEF DESCRIPTION OF DRAWINGS

FIG. 1b is a perspective view showing electrodes used in the liquid crystal microlens of FIG. 1a;

FIGS. 2a to 2d are diagrams showing an electric potential distribution in the liquid crystal microlens of FIG. 1a;

FIG. 10b is a diagram describing the operation of the compound liquid crystal microlens in the sensor of FIG. 10a;

FIG. 18b is a perspective view showing electrodes used in the liquid crystal microlens of FIG. 18a; and FIGS. 19a and 19b are diagrams showing an electric potential distribution in the liquid crystal microlens of FIG. 18a.

DETAILED DESCRIPTION OF THE PREFERRED EMBODIMENT

Figure 1A:
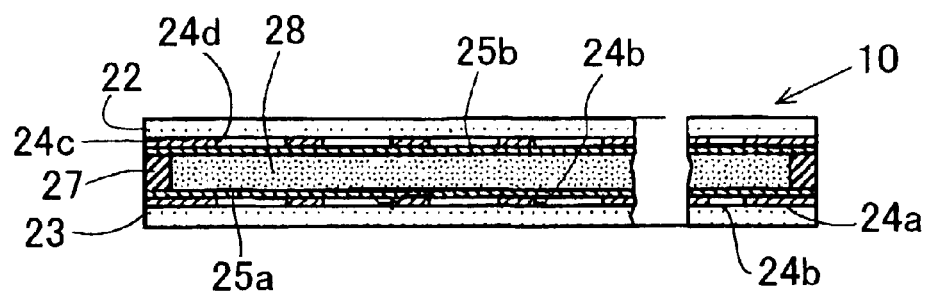
FIG. 1a is a sectional view of a liquid crystal microlens according to a first embodiment of the present invention.

A first embodiment of a liquid crystal microlens according to the present invention is described hereinafter with reference to FIGS. 1a and 1b. FIG. 1a is a sectional view showing the liquid crystal microlens for a contact-type sensor, and FIG. 1b is a perspective view of an electrode used in the microlens of FIG. 1a.

Figure 1B:
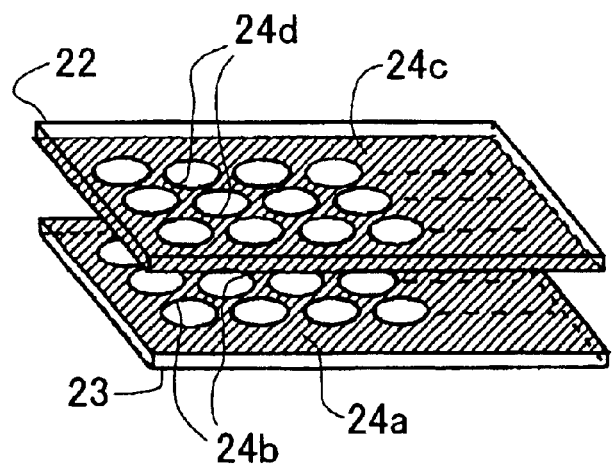

Referring to FIGS. 1a and 1b, a liquid crystal microlens 10 for a contact-type sensor comprises a lower transparent glass substrate 23, an upper transparent glass substrate 22, a pattern electrode 24a on the lower transparent glass substrate 23, a pattern electrode 24c formed on the underside of the upper transparent glass substrate 22, a transparent alignment layer 25a on the electrode 24a, a transparent alignment layer 25b on the electrode 24c and an enclosing member 27 provided between alignment layers 25a and 25b. The pattern electrode 24a is formed by a conductive electrode film and has a plurality of circular holes 24b, and the pattern electrode 24c is also formed by a conductive electrode film and has a plurality of circular holes 24d. Each of the circular holes 24d is concentrically formed with an opposite hole 24b. A liquid crystal material 28 which is hardened by irradiation of ultraviolet ray or an ultraviolet curable liquid crystal material is injected into a space defined by the enclosing member 27 and the alignment layers 25a and 25b.

The liquid crystal material 28 is a liquid crystal polymer which is polymerized when irradiated with ultraviolet ray, thereby turning into plastic. For example, the material is a polymerized liquid crystal composition including a monofunctional acrylate or a monofunctional metaacrylate having a liquid crystal structure in part, and which assumes an enantiotropic nematic liquid crystal phase at room temperature.

The alignment layers 25a and 25b are rubbed so that the alignment of each layer is antiparallel and homogenous to one another. In the present embodiment, the pattern electrodes 24a and 24c need not be transparent. The pattern electrodes 24a and 24c are so disposed that the holes 24b and the holes 24d coincide.

Figure 2A:
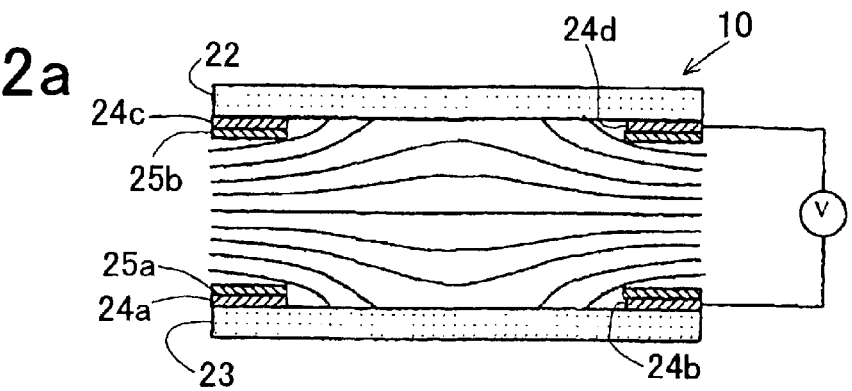
Figure 3:
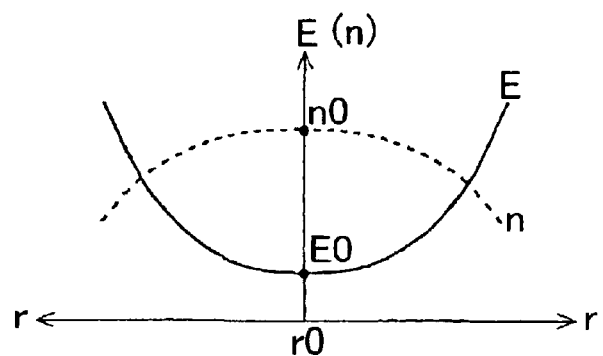
FIG. 3 is a graph showing a relationship between electric field intensity and refractive index in the liquid crystal microlens.

When the liquid crystal microlens 10 is applied with a voltage higher than a threshold, electric potentials are distributed as shown by contour lines in FIG. 2a. Here, the electric field intensity is in inverse proportion to the interval between the contour lines. As shown in FIG. 3, the electric field intensity E of the liquid crystal microlens 10 has such a spatial distribution as to be increased as the distance r from a center $r_0$ of the hole 24b (24d) of the pattern electrode 24a (24c) increases in the radial direction. The intensity E0 shown in FIG. 3 is the intensity at the center of the hole 24b.

Figure 2B:
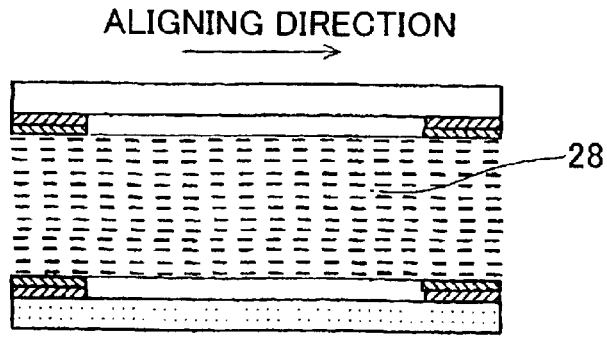

Explaining the direction of a director of the liquid crystal material 28, when the applied voltage is zero, the director is horizontal, parallel to the rubbing direction as shown in FIG. 2b. When a voltage is applied, the inclination of the director increases as shown in FIG. 2c in accordance with the electric field intensity.

Figure 2C:
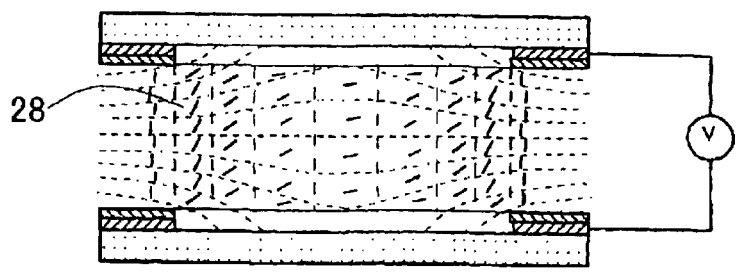
Figure 2D:
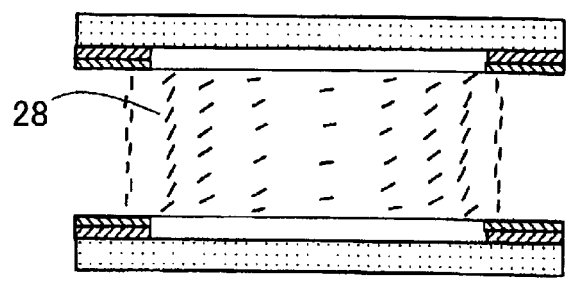

In FIG. 2c, a section of the liquid crystal material 28 is divided into a plurality of regions by the contour lines and the vertical division lines, and a typical director is shown for each region. As shown in the drawings, where the interval between the contour lines is small and the electric field intensity is large, the inclination is increased toward the perpendicular direction. With the increase of inclination, a refractive index n in the perpendicular direction decreases. As a result, as shown in FIG. 3, the refractive index quadratically decreases in accordance with the increase of the distance r. A refractive index n0 in the graph is that at the center of the hole 24b. The liquid crystal microlens 10 has such a characteristic with regard to the refractive index n.

The liquid crystal material 28 is irradiated by ultraviolet rays while the voltage is thus applied. Hence, the liquid crystal material is photo polymerized. Namely, the liquid crystal molecules are polymerized while maintaining the orientation thereof and are fixed with regards to the texture thereof. Hence, the inclinations of the directors are maintained even though the voltage is cut off, so that the distribution of the refractive index will show the same characteristics as described above. Thus the liquid crystal material 28 becomes a polymer having an effect of a lens. Accordingly, the liquid crystal microlens 10 serves as a lens even after the voltage is cut off.

The microlens 10 can be pealed off from both or either of the glass substrates 22 and 23 at use so as to reduce the weight of the lens.

An example of the liquid crystal material 28 is described hereinafter. A polymerized liquid crystal composition (A) comprising 47.5 parts by weight of a compound expressed by the formula,

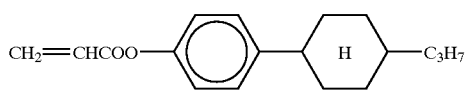

47.5 parts by weight of a compound expressed by the formula,

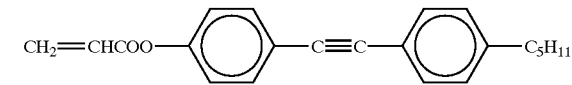

and 5 parts by weight of a compound expressed by the formula

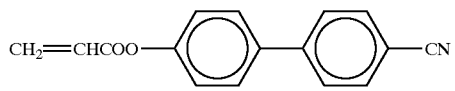

was prepared. The obtained composition (A) showed the enantiotropic nematic phase at the room temperature (25°

C.). The abnormal light refractive index ne was 1.67 while the ordinary light refractive index n0 was 1.51 and the anisotropy of dielectric constant was +0.7. One part by weight of polymerized liquid crystal composition (B) comprising IRG-651, which is a product of Ciba-Geigy, was added as an initiator for photo polymerization.

In an example of the liquid crystal microlens 10, the diameter D of the holes 24b and 24d of the electrodes 24a and 24c, respectively, was 0.3 mm and the thickness d of the liquid crystal material 28 prepared as above was 0.1 mm. A voltage of 5.1 V was applied to the liquid crystal material 28, thereby imparting thereto a distribution of refractive index dependent on the aligning distribution of the liquid crystal. The distribution was observed as concentric interference fringes with a polarizing microscope. Ultraviolet ray, the intensity of which was 1 mW/cm$^2$ was radiated under such a condition for two minutes, thereby forming a polymerized lens. Due to the polymerization, the distribution of refractive index was maintained although the voltage was no longer applied. As a result, a polymerized lens having the characteristics of a convex lens, the converging spot diameter of which was 0.01 mm was obtained.

It was confirmed that the lens effect did not change despite the lens was heated to 150° C. and hence that there was no relationship between temperature and the refractive index.

Figure 4:
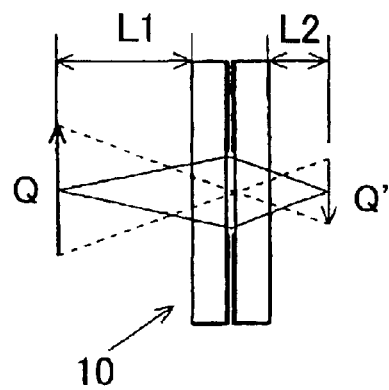
FIG. 4 is a diagram describing the operation of the liquid crystal microlens.
Figure 5:
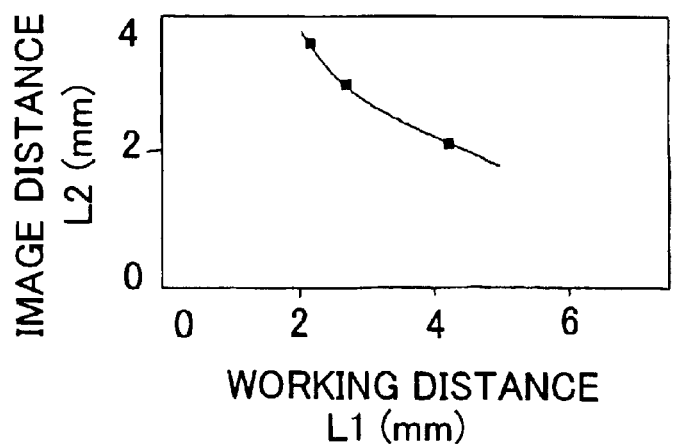
FIG. 5 is a graph showing a relationship between working distance and image distance in the liquid crystal microlens.

Referring to FIG. 4, showing the operation of the first liquid crystal microlens 10, an object Q which is positioned a working distance L1 away from the liquid crystal microlens is inverted to form an image Q' at an image distance L2 opposite the lens 10. FIG. 5 shows the change of the image distance L2 with the change of the working distance L1 in the liquid crystal microlens. Namely, when the working distance L1 sufficiently exceeds a predetermined focal length, the image distance L2 decreases in accordance with the increase of the working distance L1. On the other hand, measurement results have shown that the proportion of the size of the formed image Q' to the original object Q, that is, an image magnification m is always L2/L1. Therefore, if a suitable working distance L1 is selected, a desired magnification m can be obtained in a certain range. When image magnification m is 1, the working distance L1 or the image distance L2 depends on the dimensions of the liquid crystal microlens and on the voltage applied when polymerized. Therefore, the distances L1 and L2 can be adjusted as appropriate when applied to a sensor.

Figure 6:
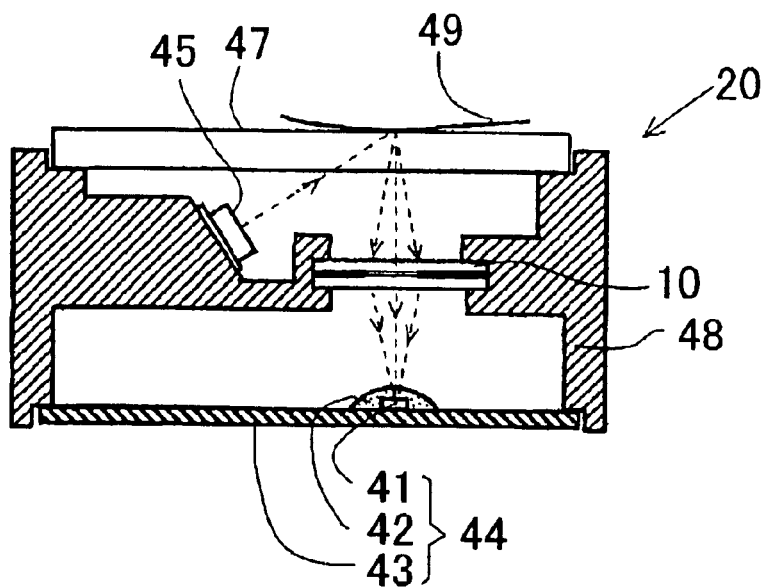
FIG. 6 is an illustration of a contact-type sensor in which the liquid crystal microlens of the present invention is employed.
Figure 14:
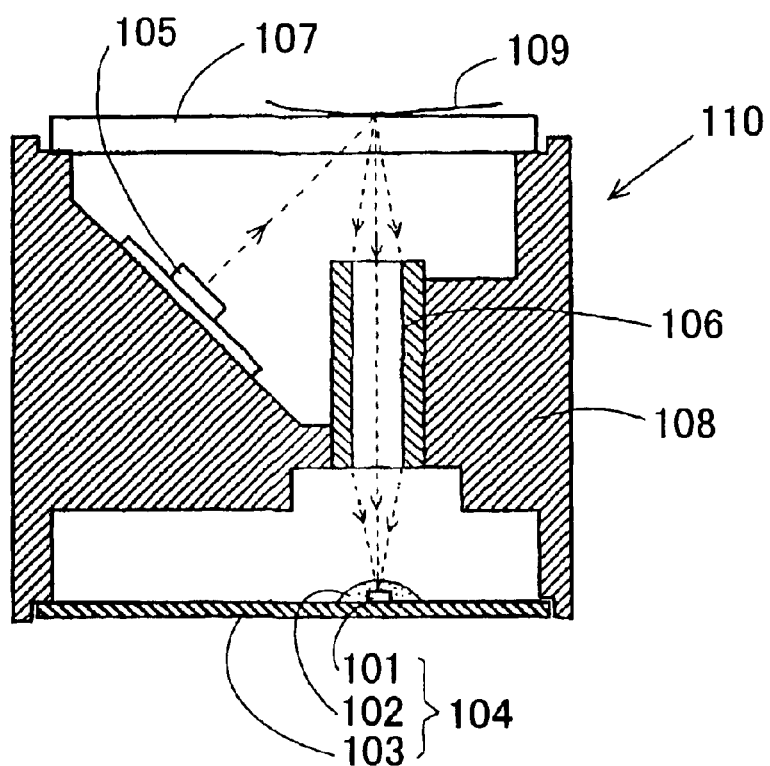
FIG. 14 is an illustration of a conventional contact-type sensor.
Figure 15:
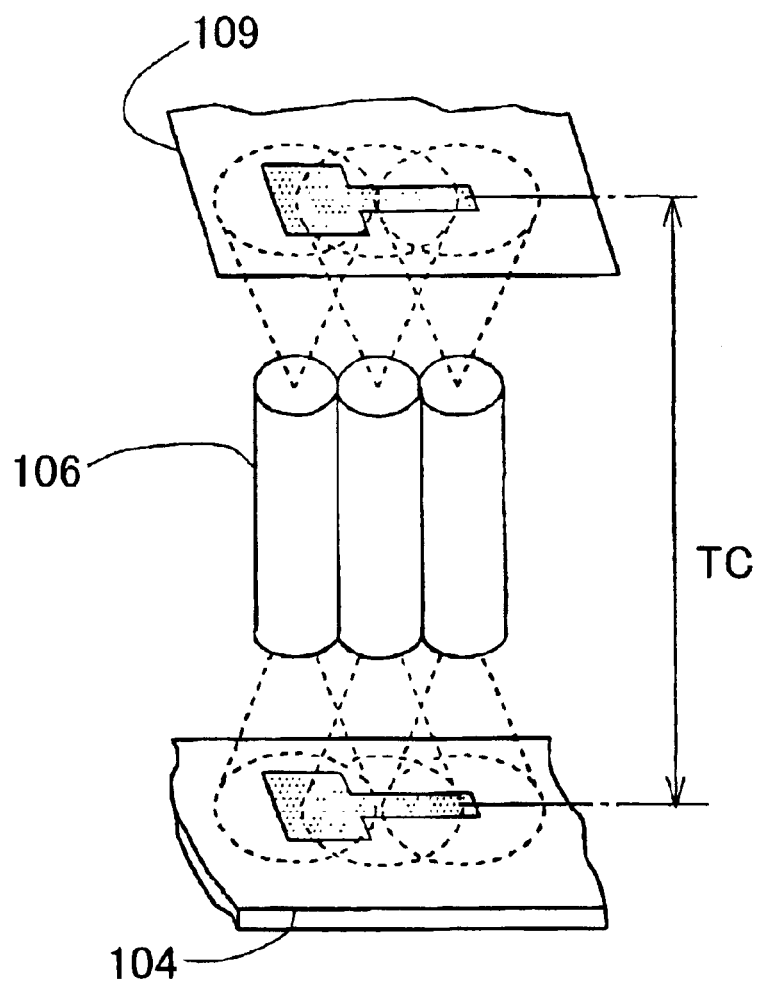
FIG. 15 is a diagram describing the operation of a rod lens array employed in the conventional sensor of FIG. 14.
Figure 16A:
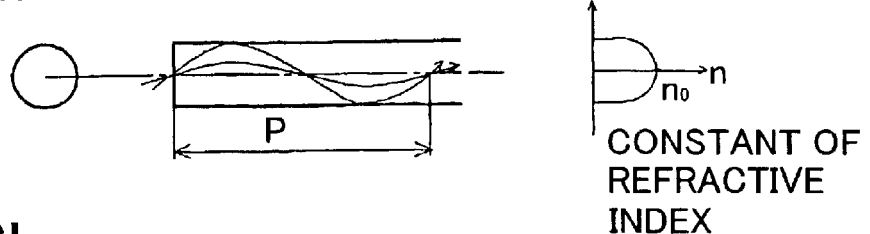
FIGS. 16a to 16c are diagrams explaining the operating principle of the rod lens array.
Figure 16B:
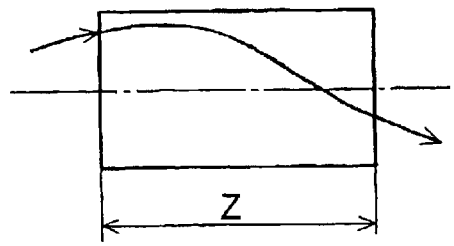
Figure 16C:
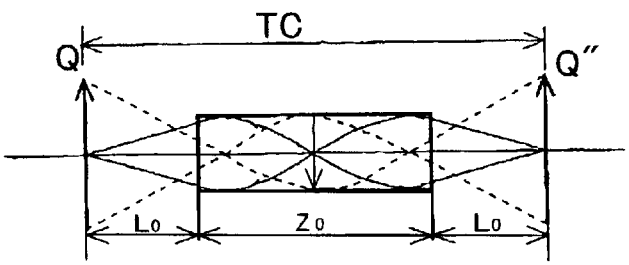
Figure 17:
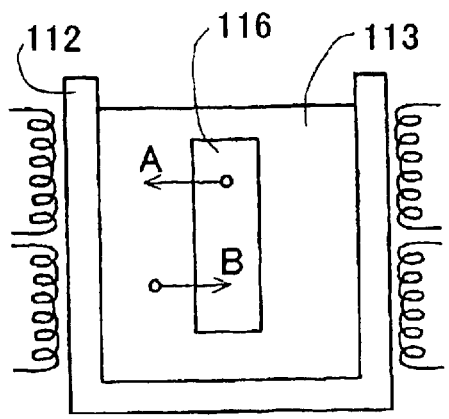
FIG. 17 is a diagram describing the ion exchange method of the rod lens array for imparting a refractive index distribution.
Figure 18A:
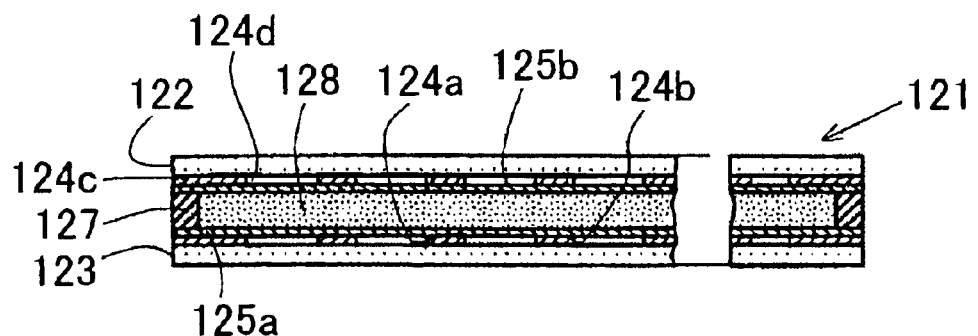
FIG. 18a is a sectional view of a conventional liquid crystal microlens.
Figure 18B:
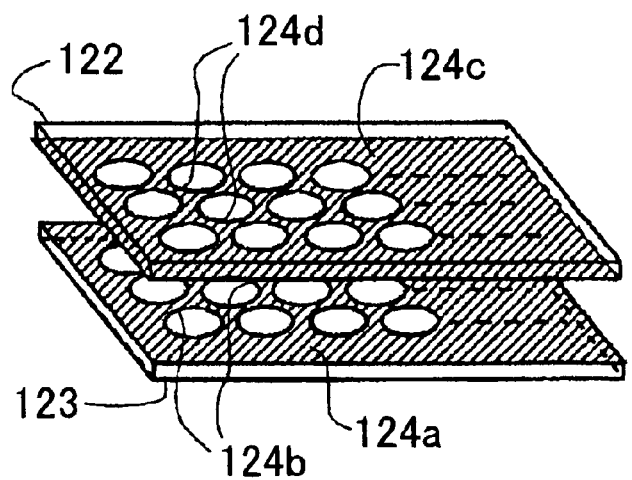
Figure 19A:
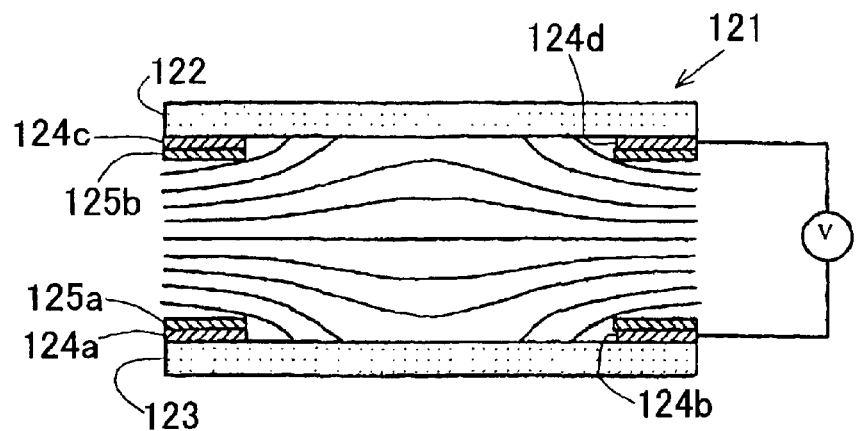
Figure 19B:
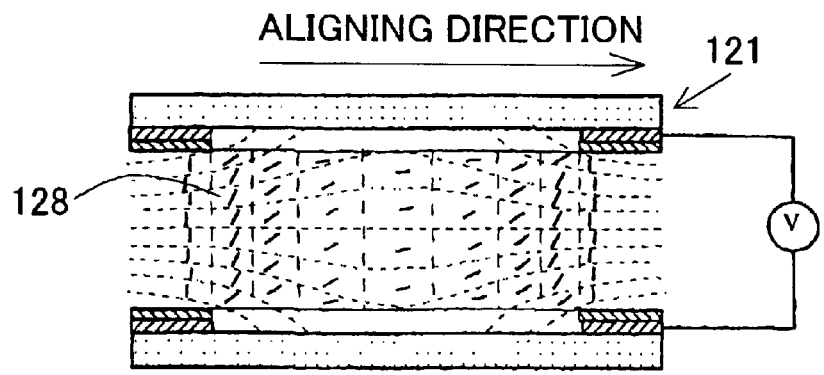

Referring to FIG. 6 showing a contact-type sensor 20 in which the liquid crystal microlens 10 of FIG. 1a is assembled instead of the conventional rod lens array 106 of FIG. 14, the sensor 20 has a frame 48 in which are mounted a linear LED array 45 and light-receiving element array 44. The light-receiving element array 44 comprises a substrate 43 formed on the bottom of the frame 48, a protection film 42 mounted on the substrate 43, and a sensor IC 41 comprising a plurality of photoelectric converters. A transparent plate 47 on which a text sheet 49 is set is mounted on the upper portion of the frame 48. The compound liquid crystal microlens 10 is mounted in the middle portion of the frame 48 between the transparent plate 47 and the light-receiving element array 44.

In operation, a light beam from the LED array 45 irradiates the text sheet 49. The light beams diffused and reflected at a particular reading line of the sheet 49 passes through each set of holes 24b and 24d and the liquid crystal material 28 so as to form images on the array of sensor of the light-receiving element array 44. Information regarding the shades of the text sheet conveyed by the reflected light, taking the form of the strength of the light, is converted into an electric signal by the sensor and serially outputted in accordance with the scanning direction. After scanning one line in the scanning direction, the next line in the direction perpendicular to the scanning direction is scanned. By repeating the scanning, the two-dimensional image information on the text sheet 49 is converted into an electric signal in time sequence.

The sensor 20 has the following advantages.

(1) After the polymerization, microlens 10 is provided with the winding interval in the same manner as the rod lens without applying a voltage. Therefore, in a hand held scanner driven by a battery such as those for facsimile machine, there is no need to apply a voltage while the sensor is operated, so that the power consumption is reduced compared to a sensor with a conventional liquid crystal microlens. Hence the life of the battery can be elongated.

(2) An IC for driving liquid crystal required in the conventional sensor need not be provided so that the manufacturing cost is reduced.

(3) The molecules of the liquid crystal are already aligned in the desired directions so that there is no need to wait for the microlens to be ready for operation after the power is turned on. Thus the operability of the sensor is improved.

Accordingly, a contact-type sensor to which the microlens 10 is applied is superior to the contact-type sensor having the conventional rod lens array 106 shown in FIG. 14 as follows.

(1) The liquid crystal microlens 10 is thinner than the rod lens so that the thickness of the sensor can be reduced.

(2) The microlens 10 can be manufactured in the same manner as an ordinary microlens array having a miniaturized lens arranged in a two-dimensional arrangement, that is, by much easier method than forming a rod lens array by ion exchange method.

(3) The refractive index is adjusted by controlling the applied voltage at the polymerizing of the ultraviolet ray hardening liquid crystal so that the resolving power, depth of focus, brightness and focal length can be arbitrarily set as desirable for various devices.

Figure 7:
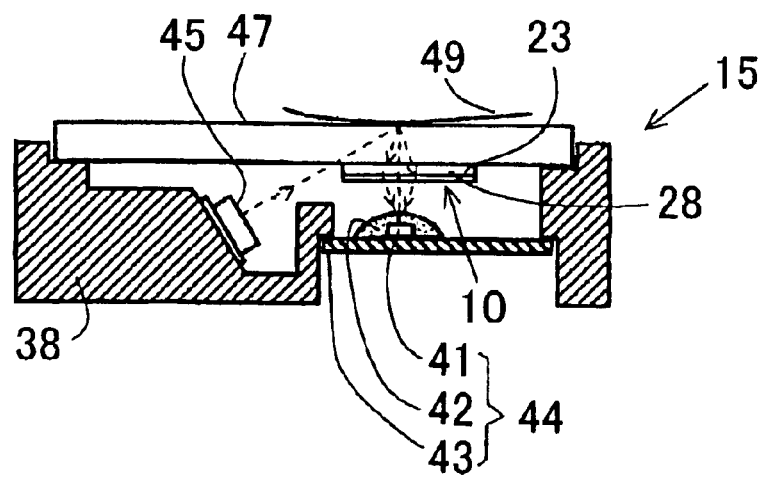
FIG. 7 is an illustration of anther contact-type sensor.

Referring to FIG. 7 showing another example of the sensor, in a contact-type sensor 15, the microlens 10 which is devoid of the upper glass substrate 22 is attached to the lower surface of the transparent plate 47. Accordingly, the working distance between the text sheet 49 on the transparent plate 47 and the microlens 10 and the image distance between the microlens 10 and the light-receiving array 44 become shorter. Thus a thinner sensor can be produced.

Figure 8:
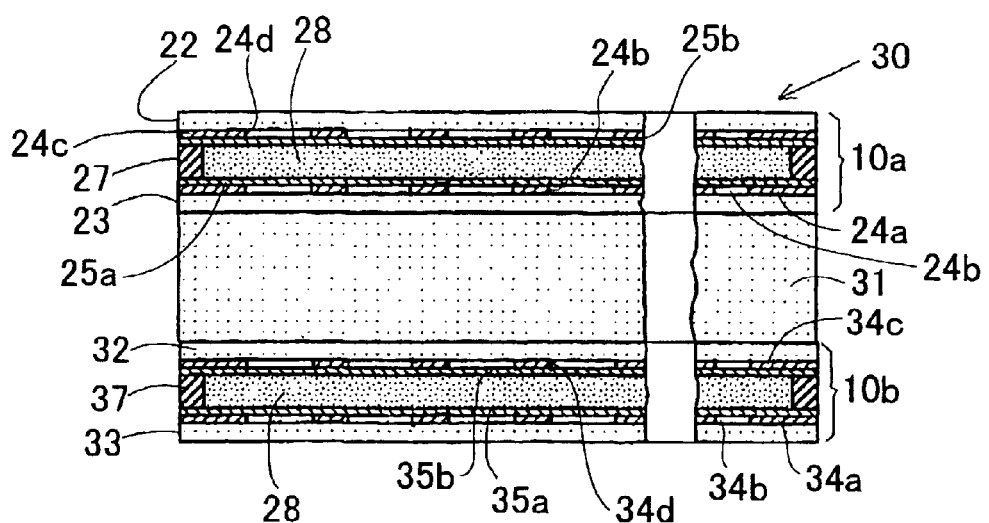
FIG. 8 is a sectional view of a compound liquid crystal microlens according to a second embodiment.

FIG. 8 shows a second embodiment where a compound liquid crystal microlens is provided.

A compound liquid crystal microlens 30 for a contact-type sensor comprises a first nematic liquid crystal cell 10a as a first liquid crystal lens, second nematic liquid crystal cell 10b as a second liquid crystal lens, and a intermediate transparent glass plate 31 interposed between the first and second liquid crystal cells 10a and 10b.

The first nematic liquid crystal cell 10a has the same construction as the liquid crystal lens of FIGS. 1a and 1b. The same numerals as those in FIGS. 1a and 1b designate the same parts in FIG. 8 and the explanations thereof are omitted.

Similarly, the second liquid crystal cell 10b comprises a lower transparent glass substrate 33, a pattern electrode 34a having a plurality of circular holes 34b, and an alignment layer 35a applied on the electrode 34a, and an enclosing member 37 on the peripheral portion of the alignment layer 35a. An upper transparent glass substrate 32, on the underside of which is formed a pattern electrode 34c having a plurality of circular holes 34d, each of which is concentric with the hole 34b, and an alignment layer 35b are mounted on the enclosing member 37. A pair of holes 34b and 34d is concentric with a pair of opposite holes 24b and 24d. The liquid crystal material 28 is injected into a space defined by the enclosing member 37 and the alignment layers 35a and 35b. The alignment layers 35a and 35b are rubbed so that the alignment of each layer is antiparallel and homogenous to one another. The lower glass 23 of the first liquid crystal cell 20 and the upper glass 32 of the second liquid crystal cell are adhered to each other interposing the intermediate glass plate 41, thereby forming the microlens 40. The holes 24b, 24d of the first cell 20 and the holes 34b and 34d of the second cell 30 are adapted to coincide with each other.

Figure 9A:
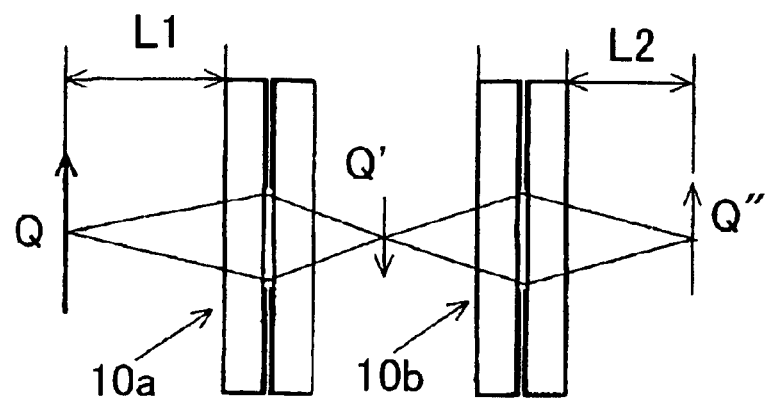
FIGS. 9a and 9b are diagrams describing the operation when two liquid crystal cells of the microlens of FIG. 8 are assembled.
Figure 9B:
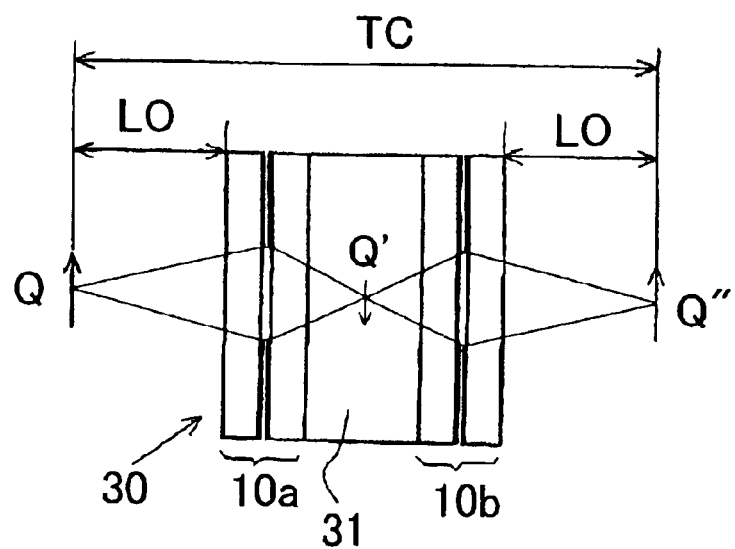

As shown in FIG. 9a, the first liquid crystal cell 10a and the second liquid crystal cell 10b are disposed in axial symmetry. The inverted image Q' of the object Q formed by the first liquid crystal cell 10a is further inverted by the second liquid crystal cell 10b at the image distance L2, resulting in an erecting image Q". In accordance with the above described principle, the position of the inverted image Q' of the size same as that of the object Q changes with the change of the working distance L1, and furthermore, so does the image distance L2. The measurement results has shown that the proportion of the size of the erecting image Q" to the original object Q, that is the final image magnification M is substantially L2/L1. Hence by setting an appropriate working distance L1 so that L1=L2=L0 (FIG. 9b), the image magnification M becomes 1. Such a conjugating relation between the liquid crystal cells renders it possible to provide the erecting image Q" of the same size as the object Q. The working distance of the microlens can be arbitrarily set by changing the thickness of the glass plate 31. This causes the TC length, which is the distance between the object and the image, to change. Namely, the TC length tends to become short as the focal length is shortened. The focal length can be controlled by selecting an appropriate voltage at the polymerization of the liquid crystal material 28.

The liquid crystal microlens 30 of the second embodiment may be further modified by integrating the glass plate 31 with the lower glass substrate 23 of the first liquid crystal cell 10a and the upper glass substrate 32 of the second liquid crystal cell 10b, so that the structure of the liquid crystal microlens 30 is simplified. Accordingly, the holes 24b,24d, 32b and 34d can be aligned with more accuracy. In another modification of the liquid crystal microlens 30, the upper glass substrate 22 and the pattern electrode 24 of the first liquid crystal cell 10a and the lower glass substrate 33 and the pattern electrode 34a of the second liquid crystal cell 10b can be peeled off after the liquid crystal material 28 is hardened by polymerization. Thus the microlens becomes simpler in construction and requires less space.

Figure 10A:
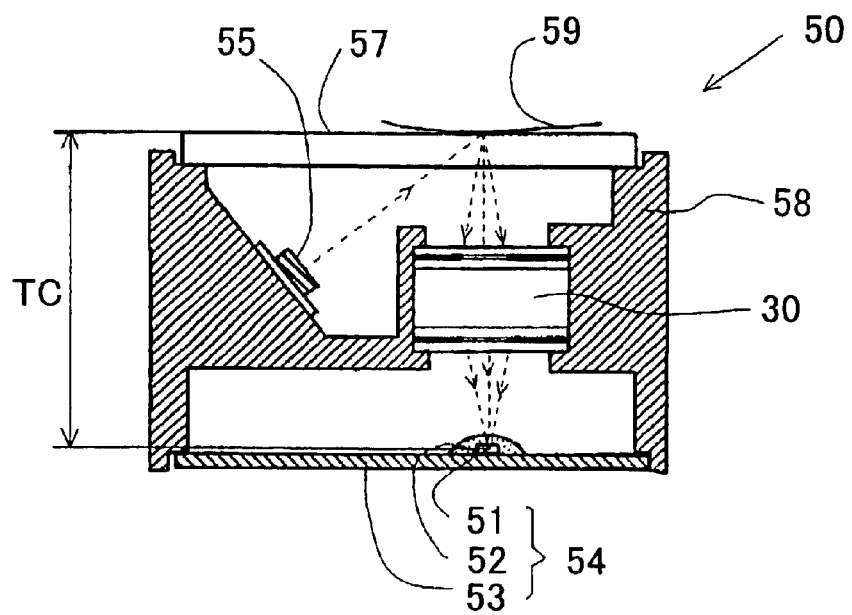
FIG. 10a is an illustration of a contact-type sensor in which the compound liquid crystal microlens of FIG. 8 is employed.

Referring to FIG. 10a showing a contact-type sensor 50 in which the compound liquid crystal microlens 30 is assembled instead of the conventional rod lens array, the sensor 50 has a frame 58 in which are mounted a linear LED array 55 and light-receiving element array 54. The light-receiving element array 54 comprises a substrate 53 formed on the bottom of the frame 58, a protection film 52 mounted on the substrate 53, and a sensor IC 51 comprising a plurality of photoelectric converters. A transparent plate 57 on which a text sheet 59 is set is mounted on the upper portion of the frame 58. The compound liquid crystal microlens 30 is mounted in the middle portion of the frame 58 between the transparent plate 57 and the light-receiving element array 54.

Figure 10B:
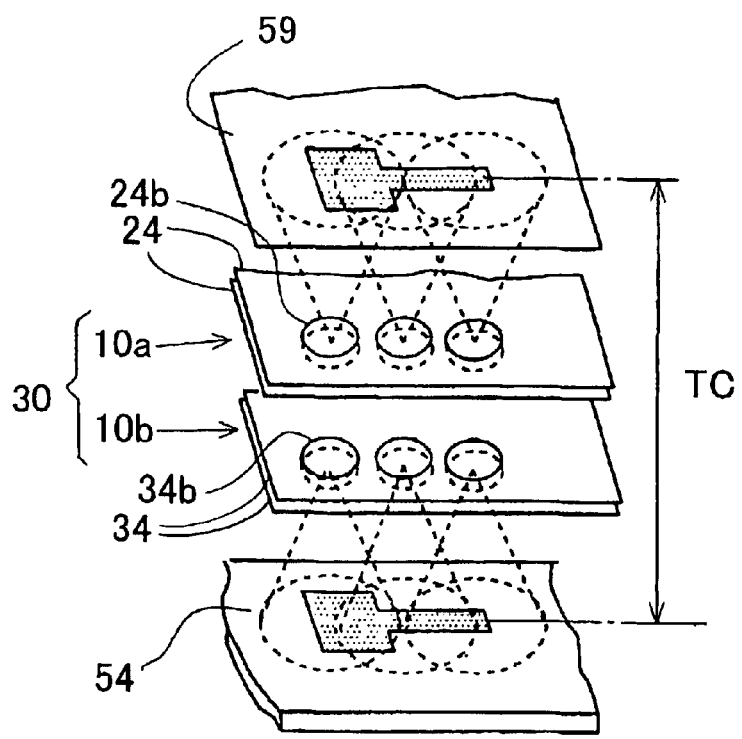

FIG. 10b in which the glass substrate and others are omitted shows the operation of the compound liquid crystal microlens. As shown in the FIG. 10b, the compound liquid crystal microlens 30 comprises a plurality of microlenses each having a diameter as that of the holes 24b, 24d, 34b and 34d. In operation, a light beam from the LED array 55 irradiates the text sheet 59. The light beams diffused and reflected at a particular reading line of the sheet 59 passes through each set of holes 24b, 24d, 34b and 34d and the liquid crystal material 28 so as to form images on the array of sensor of the light-receiving element array 54. Information regarding the shades of the text sheet conveyed by the reflected light, taking the form of the strength of the light, is converted into an electric signal by the sensor and serially outputted in accordance with the scanning direction. After scanning one line in the scanning direction, the next line in the direction perpendicular to the scanning direction is scanned. By repeating the scanning, the two-dimensional image information on the text sheet 59 is converted into an electric signal in time sequence.

The compound liquid crystal lens of the present embodiment has the following advantages over the conventional rod lens array.

(1) The TC length of the rod lens array can only be chosen from the lineup of the products, so that it is not possible to decrease the TC length to manufacture a thin contact-type sensor. However, the compound liquid crystal microlens renders it possible to form a lens of an arbitrary TC length so that a thin contact-type sensor may be manufactured.

(2) Since a smaller lens diameter can be provided in the compound liquid crystal microlens of the present invention than the conventional rod lens array, when a suitable working distance is obtained, the focusing depth is increased, thereby improving a resolution of the image. Moreover, since the density of the lens is increased under such a circumstance, the brightness of the image is not deteriorated.

Figure 11:
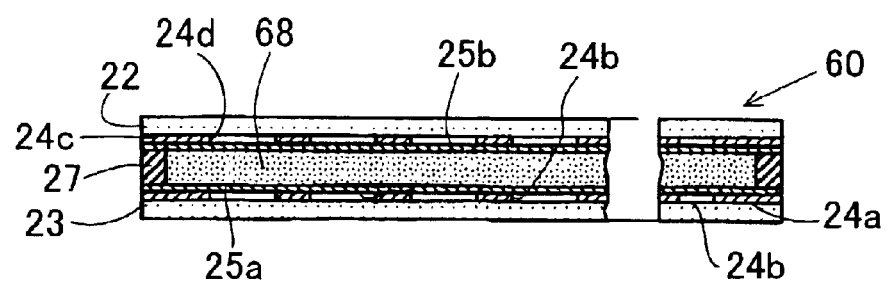
FIG. 11 is a sectional view of a liquid crystal microlens according to the third embodiment of the present invention.

Referring to FIG. 11, a liquid crystal microlens 60 according to the third embodiment of the present invention has the same construction as the liquid crystal microlens 10 of the first embodiment. The microlens 60 differs from the microlens 10 in that the liquid crystal layer 68 is provided instead of the liquid crystal material 28. The liquid crystal layer 68 is made of a liquid crystal composite material comprising 5% or-less of ultraviolet ray hardening liquid crystal polymer mixed with nematic liquid crystal. The nematic liquid crystal is, for example, ZL1-2471, a product of Merck & Co., Ltd.

Figure 12A:
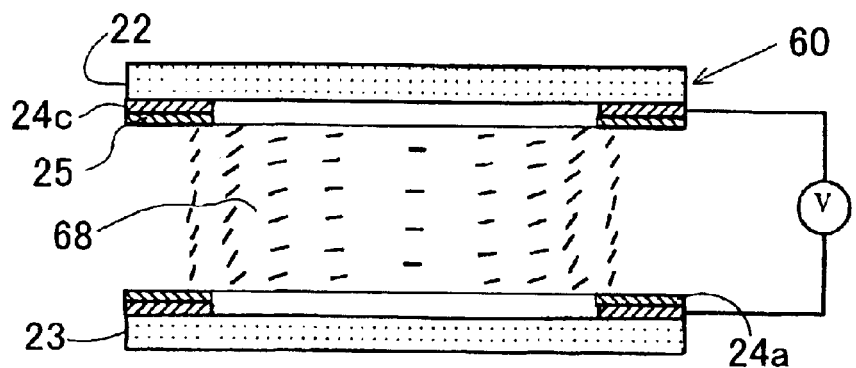
FIGS. 12a to 12c are diagrams showing alignment of liquid crystal molecules in the microlens of FIG. 11.
Figure 12B:
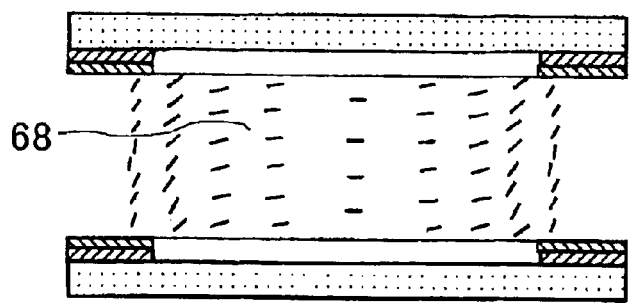
Figure 12C:
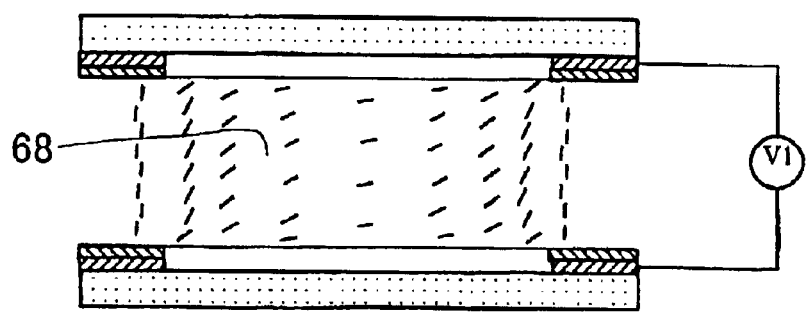

When voltage is applied to the pattern electrodes 24a and 24c, the molecules of both the nematic liquid crystal and the liquid crystal polymer are aligned in directions dependent on the applied electric field as shown in FIG. 12a. The microlens 60 is irradiated with ultraviolet ray under the condition so that only the ultraviolet ray hardening liquid crystal material is polymerized and hardened. The alignment of the nematic liquid crystal is maintained by the polymer network of the ultraviolet ray hardening liquid crystal. Therefore, various alignments of the nematic liquid crystal are maintained as shown in FIG. 12b even after the supply of the voltage is cut off. Thus the liquid crystal layer 68 has a convex lens effect as the microlens 10 of FIG. 1a. Even after the liquid crystal layer is polymerized and hardened, when a voltage larger than a predetermined value is applied to the electrodes, the alignment of the molecules in the nematic liquid crystal can be changed as shown in FIG. 12c, thereby enabling to adjust the lens effect of the liquid crystal lens 60.

The liquid crystal microlens 60 of the third embodiment of the present invention has the advantage of the microlens 10 that the characteristics of the lens is obtained without applying voltage, and in addition, the focal length of the lens can be adjusted by applying voltage when used. Therefore, when the microlens is used in the sensor 20 of FIG. 6 or the sensor 50 of FIG. 10, the operability of the sensor is improved.

Figure 13A:
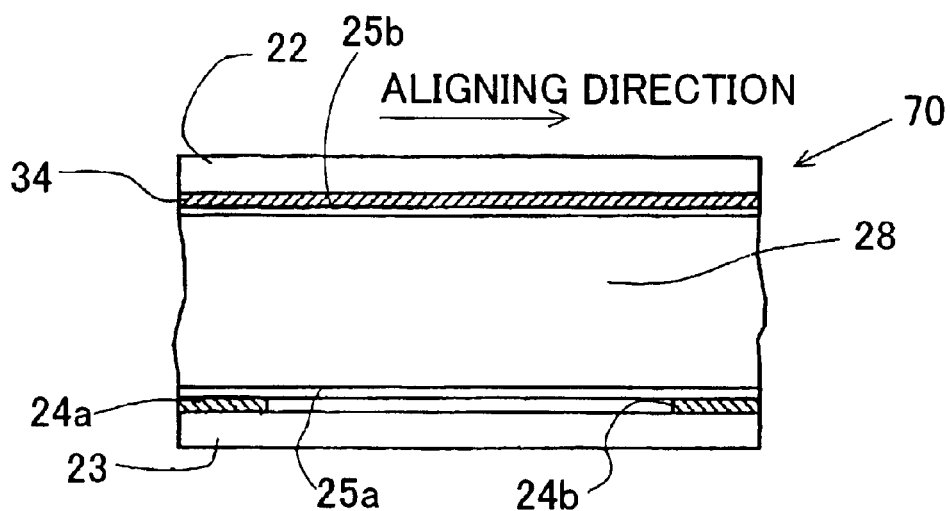
FIGS. 13a and 13b are diagrams showing an electric potential distribution in the liquid crystal cell of FIG. 11.
Figure 13B:
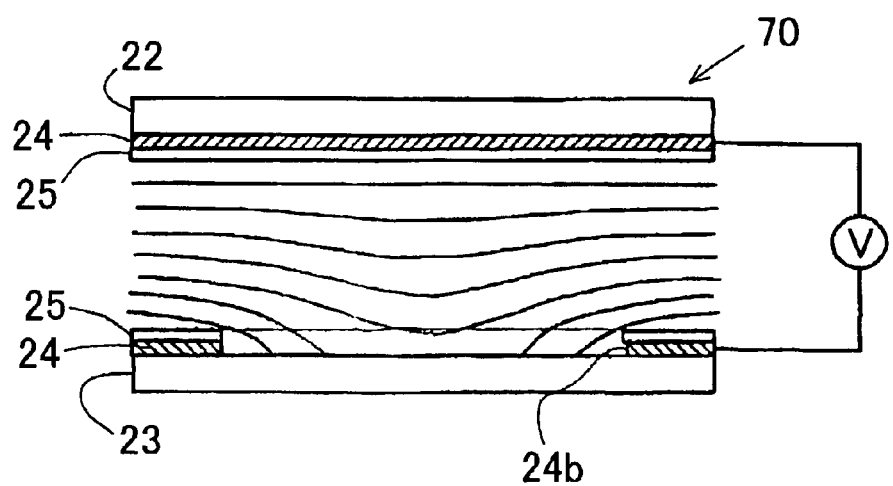

FIGS. 13a and 13b show a liquid crystal microlens 70 of the fourth embodiment of the present invention. Referring to FIG. 13a, whereas the pattern electrode 24 having a plurality of holes 24b is formed on the lower substrate 23 as in the first embodiment, a transparent electrode 34 is formed on the underside of the upper substrate 22. Other constructions are the same as those of the first embodiment.

When the electrodes 24a and 44 are applied with voltage, there is generated a distribution of potential as shown by the contour lines in FIG. 13b. More particularly, the electric field becomes more intense as it becomes distant from the center of the hole 24b in the radial direction thereof, thereby forming a refractive index distribution similar to that shown in FIG. 3. Thus refractive index is unevenly distributed due to the various aligning direction of the molecules in the liquid crystal material 28 so that the characteristic of a convex lens is achieved. When the ultraviolet ray is irradiated for polymerization, the characteristic is maintained even after the voltage is cut off.

The liquid crystal microlens 70 may be so modified that the microlens has the liquid crystal layer 68 of FIG. 11 comprising liquid crystal composite material having liquid crystal polymer mixed with nematic liquid crystal.

From the foregoing it will be understood that the present invention provides a liquid crystal microlens for a contact-type sensor where the liquid crystal microlens need not be applied with voltage at the time the sensor is used so that the power consumption is decreased. It becomes unnecessary to provide the IC for driving the liquid crystal so that the manufacturing cost is decreased. The response time dependent on the response speed is shortened so that the sensor can be quickly started.

While the invention has been described in conjunction with preferred specific embodiment thereof, it will be understood that this description is intended to illustrate and not limit the scope of the invention, which is defined by the following claims.

What is claimed is:

1. A liquid crystal lens comprising:
   a pair of transparent upper and lower glass substrates which are disposed apart from each other so as to form a space there-between;
   a pair of electrodes provided on the underside of the upper substrate and on the upper surface of the lower substrate;
   an alignment layer formed on each of the electrodes;
   at least one electrode having at least one hole;
   an ultraviolet curable liquid crystal material charged in the space,
   the liquid crystal material having a lens construction formed by an electric current and hardened by irradiation of ultraviolet rays.

2. A liquid crystal lens comprising:
   a pair of transparent upper and lower glass substrates which are disposed apart from each other so as to form a space there-between;
   a pair of electrodes provided on the underside of the upper substrate and on the upper surface of the lower substrate;
   an alignment layer formed on each of the electrodes;
   each of the electrodes having a plurality of circular holes, each of the holes of one of the electrodes being opposed to the hole of the other electrode;
   an ultraviolet curable liquid crystal material charged in the space,
   the liquid crystal material having a lens construction formed by an electric current and hardened by irradiation of ultraviolet rays.

3. The liquid crystal lens according to claim 2 further comprising nematic liquid crystal mixed in the ultraviolet curable liquid crystal material.

* * * * *